Patented June 15, 1954

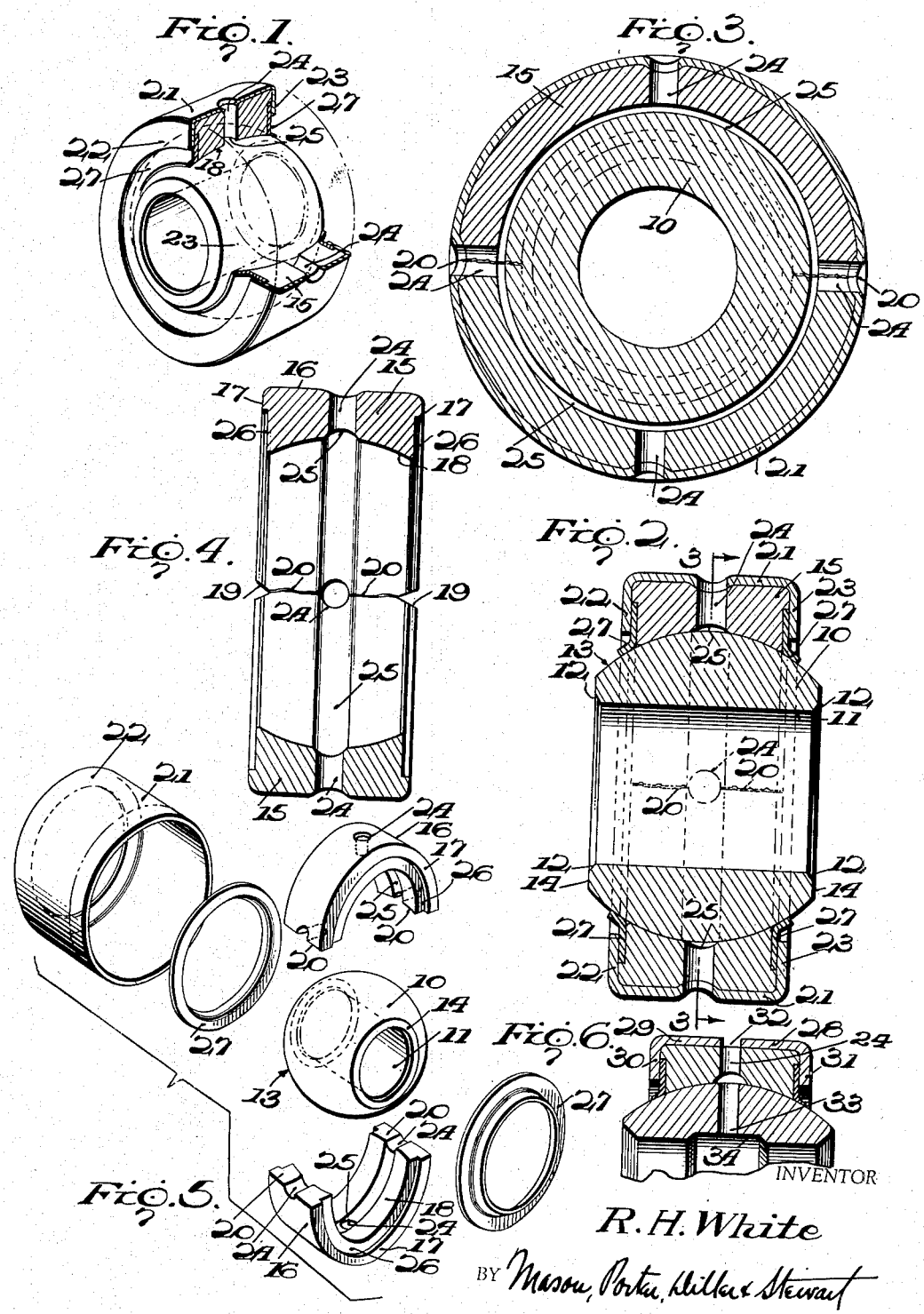

2,681,259

UNITED STATES PATENT OFFICE 2,681,259

MONOBALL SELF-ALIGNING BUSHING

Robert Hedges White, Torrington, Conn., assignor to The Torrington Company, Torrington, Conn., a corporation of Maine Application September 12, 1952, Serial No. 309,203

1 Claim. (Cl. 308—72)

The invention relates to new and useful improvements in a mono-ball self aligning bushing.

An object of the invention is to provide a mono-ball bushing wherein the outer race may be of hardened steel, ground before assembly so as to accurately fit with close tolerance the spherical ball with which it is to be associated, which ball is likewise of hardened steel ground to accurate size.

A further object of the invention is to provide a mono-ball bushing of the above type wherein the outer race is diametrically fractured longitudinally thereof with the fractured surfaces in mating contact when in assembled position on the ball.

A still further object of the invention is to provide a mono-ball bushing of the above type wherein the fractured outer ball sections are held in mating contact by a metal cup having inwardly extending flanges, which cup snugly fits the outer portion of said race.

These and other objects will in part be obvious and will in part be hereinafter more fully described.

In the drawings:

Figure 1 is a perspective view of the improved mono-ball bushing with a section of the outer race and retaining cup removed;

Figure 2 is an enlarged vertical section taken longitudinally through the center of the bushing and perpendicular to the plane of fracture;

Figure 3 is a section of the bushing taken on the line 3—3 of Figure 2;

Figure 4 is a vertical section of the outer race taken longitudinally through the center of the race and perpendicular to the plane of fracture;

Figure 5 is a perspective view showing all the parts of the bushing disassembled and separated from each other and in a position for assembling; and Figure 6 is a view in section of a portion of the bushing showing a modified form of retaining cup and also of the oil supplying ports.

The invention has to do with a mono-ball self aligning bushing. The bushing includes a ball or a spherical inner member 10 having a diametrical opening 11, for a shaft (not shown). The opening is cylindrical in shape with the corners 12 cut away to facilitate the insertion of the shaft into the ball. The outer surface 13 of the ball is a segment of a sphere terminating in flat sides 14, 14. The ball is made from steel. After being machined to the form desired it is heat treated and hardened and then ground to accurate dimensions. Preferably the outer surface of the ball is chrome plated.

The outer race 15 is formed of steel and is generally cylindrical on its outer face 16 and has flat ends 17, 17. The inner surface 18 of the outer race is machined to conform generally to the spherical surface 13 of the ball 19. It is then heat treated and hardened and then ground to an accurate size so that when assembled on the ball, the bushing will have close tolerance, ground mating surfaces.

After the outer race has been ground it is fractured on opposite sides thereof and in a plane extending longitudinally of the race and through the center thereof. The ends of the race are notched at 19, 19 to aid in fracturing and in locating the fracture. The fracture line and the fractured surface are indicated at 20 in the drawings. This fracturing of the race divides the completed race into two half sections which can be readily assembled on the ball with their fractured surfaces in mating contact.

The race sections are held in assembled position on the ball, as shown in Figures 1 to 5, by a metal cup 21. This cup is preferably formed of low carbon steel and is given a cadmium plate finish. The cup has one preformed flange 22. The cup is slipped onto the outer race sections when assembled with a snug fit, after which the open end of the cup is turned inwardly of the race to provide a second retaining flange 23. The intermeshed fractured surfaces will hold the half race section in endwise alignment while forming the retaining flange.

The race 15 has equally spaced radial openings 24, midway the ends of the race, the purpose of which is to furnish lubrication to the spherical contacting surfaces. As shown, there are four, and two of the openings are disposed in the fracturing plane and aid in fracturing the race. On the inner face of the outer race is a groove 25 connecting the openings for distributing the lubricant.

At each end of race 15 is an annular recess 26 which extends to the inner face of the race. Disposed in these annular recesses are oil sealing washers 27 preferably of nylon, fairprene or the like. The spherical surface of the ball is of greater width than that of the race so that the ball and race can shift angularly for the purpose of aligning the shaft with the opening 11 in the ball without the race losing contact with the ball. The oil sealing washers make contact with the extended surfaces of the ball. The flanges 22 and 23 contact the washers and hold them firmly seated in their respective recesses.

In Figure 6 there is shown a modified form of retaining cup. The cup is made in two sections 28 and 29. The section 28 has a preformed flange 30 and the section 29 has a preformed flange 31. These cup sections are dimensioned so as to make a press fit with the outer face of the race 15 and thus serve as a means for holding the sections of the race in assembled position. When the cup sections are in place their inner edges are spaced and form an annular groove 32 connecting the openings 24. This facilitates the distribution of the lubricant on the outer face of the bushing.

In Figure 6 there is shown radial openings 33 through the ball and an annular recess or chamber 34 connecting the recess. This provides a means for furnishing lubrication to the shaft and inner surface of the opening 11 through the ball. Otherwise than the two features just described, the bushing is of the same construction as shown and described in Figures 1 to 5.

It is obvious that minor changes in the details of construction can be made without departing from the spirit of the invention as set forth in the appended claim.

I claim:

A self-aligning mono-ball bushing comprising an inner ball of hardened steel ground to an accurate spherical shape, said ball having an opening for a shaft, a hardened steel outer race member ground to provide an internal spherical surface adapted to accurately fit with close tolerance the spherical surface of the ball, said race being fractured in a diametrical plane extending longitudinally of said outer race to form two half sections, said fractured surfaces being in mating contact when assembled on the ball and operating to hold said half sections in endwise alignment, and a metal cup having inwardly extending flanges snugly fitting said outer race for holding said outer race sections in assembled position on said ball, said outer race having annular recesses in the ends thereof and oil seal washers disposed in said recesses and contacting the spherical surface of the ball, said oil seal washers being held in place by said cup flanges, the inner surface of said outer race having a groove disposed midway between the ends of the race and radial ports extending through the cup and the outer race and connecting with said groove for furnishing lubrication to the spherical contacting surfaces, two of said radial openings being disposed in the fracturing plane to aid in fracturing the race.

References Cited in the file of this patent

UNITED STATES PATENTS

| Number | Name | Date |
|---|---|---|
| 1,675,728 | Pierce, Jr. | July 3, 1928 |
| 2,365,552 | Hill | Dec. 19, 1944 |

FOREIGN PATENTS

| Number | Country | Date |
|---|---|---|
| 551,238 | France | Mar. 30, 1923 |